United States Patent [19]

Maeda

[11] Patent Number: 5,068,633
[45] Date of Patent: Nov. 26, 1991

[54] AUTOMATIC CANCELING DEVICE FOR A WINKER

[75] Inventor: Takuya Maeda, Furukawa, Japan

[73] Assignee: Alps Electric Co., Ltd., Tokyo, Japan

[21] Appl. No.: 534,400

[22] Filed: Jun. 6, 1990

[30] Foreign Application Priority Data

Sep. 9, 1989 [JP] Japan .................... 1-105715[U]

[51] Int. Cl.$^5$ ............................................. H01H 3/00
[52] U.S. Cl. ..................................... 335/190; 200/61.27
[58] Field of Search ............... 200/12, 61.27, 61.3, 200/61.33, 61.38, ; 335/166, 168, 172, 173, 186, 189, 190

[56] References Cited

U.S. PATENT DOCUMENTS

| | | | |
|---|---|---|---|
| 2,535,384 | 12/1950 | Batt | 307/10.1 |
| 2,863,096 | 12/1958 | Hollins et al. | 315/83 |
| 2,924,680 | 2/1960 | Swenson | 200/61.3 |
| 4,097,700 | 6/1978 | Okazaki | 200/61.27 |
| 4,748,298 | 5/1988 | Chretien | 200/12 |
| 4,801,770 | 1/1989 | Yukitomo et al. | 200/61.27 |
| 4,902,860 | 2/1990 | Maeda | 200/61.27 |
| 4,939,540 | 7/1990 | Kamada et al. | 200/61.27 |

Primary Examiner—J. R. Scott
Attorney, Agent, or Firm—Guy W. Shoup; B. Noel Kivlin

[57] ABSTRACT

An automatic cancelling device for a winker is disclosed, in which a locking removing member can efficiently transmit a stroke of a working member of a solenoid when returning a holder to neutral position. Construction of the locking removing member includes an engaging portion that engages with the working member of the solenoid, a first fulcrum portion on one side of the locking removing member which is brought into contact with the holder, and a second fulcrum portion on the other side of the locking removing member which is brought into contact with a supporting portion located on the lower case. Further, engaging protruding portions, disposed on one side of the holder, slide upon cam portions disposed on the locking removing member on either side of the engaging portions. Hence, by using the construction above, the locking removing member is rotated around one of the fulcrum portions without rotation of the working member of the solenoid.

1 Claim, 7 Drawing Sheets

AUTOMATIC CANCELING DEVICE FOR A WINKER

FIELD OF THE INVENTION

The present invention relates to an automatic canceling device for a winker, and in particular to an automatic canceling device of electric type, i.e. capable of removing locking by attractive force of a solenoid, even if the operation knob for the winker is at a position away from the steering shaft.

BACKGROUND OF THE INVENTION

In general, in this kind of electric type automatic canceling devices for a winker, a winker operation lever pivoted by the operation knob is mounted pivotably on a case. A driving bar is held slidably by this lever through a compression spring so that this driving bar is thrusted with pressure on a cam, which is opposite thereto. As indicated in FIGS. 5A and 5B, this cam is composed of a fixed cam portion 23 and a movable cam portion 25 disposed in a slit 24 formed at the central portion of this fixed cam portion 23 so as to be movable up and downward. Grooves 26 and 27 for holding the winker operation lever stated above at its neutral position are formed in these fixed and movable cam portions 23 and 25, respectively, and further locking grooves 28 and 29 for holding the winker operation lever at the left and right positions, respectively, are formed in the fixed cam portion 23. This movable cam portion 25 is energized downward by a spring and moved in the locking removing direction, i.e. upward, by a solenoid excited by a removing signal produced e.g. by a returning rotation of the steering wheel, etc.

By the prior art technique described above, in order to locate the winker operation lever at its neutral position without shaking, the compression spring thrusting the driving bar with pressure into the groove 26 formed in the cam should have a certain spring pressure. Consequently, when the driving bar is engaged with the left and right locking grooves 28 and 29, the spring pressure becomes still greater. Since the movable cam portion 3 is moved upward against the compression spring by the excitation of the solenoid, in such a state, so as to compress the driving bar, the spring force of the compression spring at removing the locking is great. Therefore a great solenoid is necessary in order to move the movable cam portion 25 upward against this spring force, which impedes to reduce the size and raises the cost.

Therefore, in order to solve the problem described above, the applicant of the present invention has proposed Japanese Utility Model, application No. 63-61587. This canceling device for a winker comprises, as indicated in FIGS. 6A and 6B, a case 30; a winker operation lever 31 held pivotably by the case 30; a driving shaft 33 mounted extensively on this lever 31 through a compression spring 32; a cam 37 having grooves 34, 35 and 36 holding the lever 31 at the neutral, the left and the right position, respectively, by being engaged with this driving shaft 33; a removing member 39, which is brought into contact with a cam portion 38 disposed on the lever 31 and rotates the lever 31 in the locking removing direction; and a solenoid driving this locking removing member 39 and excited by a returning rotation of the steering wheel.

Consequently, since the winker operation lever 31 is rotated in the locking removing direction through the removing member 39 by the excitation of the solenoid, the compression spring 32 is not compressed directly by the solenoid and therefore no solenoid having a great force for compressing the compression spring 32 is needed. Further, since the whole surface of the contacting portion 39a of the removing member 39 is brought into contact with pressure with the cam portion 38 at the neutral position, this neutral position is held further stably so that fluctuations are prevented. Further, since the spring force of the compression spring 32 can be small, the force needed for the operation is alleviated. Still further, as indicated in FIG. 6B, since the contact position between the cam portion 38 and the contacting portion 39a of the locking removing member 39 at the left position is away from the pivoting shaft 40, the force required for rotating the winker operation lever 31 may be small. In addition, a spring force of a plate spring is applied to the locking removing member 39, which reduces further the excitation force of the solenoid.

Furthermore the working piece 41 of the solenoid is made of a metal and on the other hand the lever 31 is made of synthetic resin. Therefore, when these two members are slid directly, abrasion of the sliding surface of the lever 31 is great. For this reason, it is possible to reduce the abrasion of the lever 31 by interposing the locking removing member 39 made of synthetic resin therebetween.

Now, by the prior art technique described above, when the lever 31 is pivoted, the contacting position between the cam portion 38 and the contacting portion 39a of the locking removing member 39 is detached from the pivoting shaft 40, i.e. from the center of the working piece 41. Therefore, although the rotational force of the lever 31 may be small as described previously, a non-uniform force is applied to the plunger of the solenoid due to the deviation of the contact point, which gave rise to decrease in the durability and the attractive force of the plunger.

Further, if the contacting surface between the locking removing member 39 and the case is not set so as to be long in some degree, the removing member 39 is apt to be inclined and no sure sliding displacement is secured. This is a serious obstacle at realizing to reduce the size of products. In addition, a force acts on the locking removing member 39 so as to incline it, due to the fact that the contacting position described above is deviated. Consequently, when the contacting surface is shortened for the purpose of reducing the size of the whole device, the inclination of the locking removing member 39 increases further. Furthermore, since the removing member 39 is guided slidably on the two side walls of the case 30, when different members are extended or contracted due to temperature variations, gaps are produced and the locking removing member 39 becomes apt to be inclined.

OBJECT OF THE INVENTION

The present invention has been done in view of the problems of the prior art technique described above and the object thereof is to provide an automatic canceling device for a winker, in which the durability of the solenoid is improved; decrease in the attractive force is prevented; displacement is surely transmitted; the reliability of the product is raised; and it is possible to intend to reduce the size.

SUMMARY OF THE INVENTION

In order to achieve the above object, an automatic canceling device for a winker according to the present invention comprises a case; a holder mounted pivotably on the case; a locking mechanism for holding the holder at either one of the neutral position and inclined positions; a solenoid having a working member moving approximately straight in a direction perpendicular to the pivoting direction of the holder; and a locking removing member disposed between the working member of the solenoid and the holder and acting so as to return the holder towards the neutral position; wherein the locking removing member consists of an engaging portion, with which the working member is engaged, a fulcrum portion disposed on each of the two sides of the engaging portion, and a thrusting portion extending from the fulcrum portion, which is brought into contact with the holder described above, the device comprising further a supporting portion, which is brought into contact with the fulcrum portion at the returning operation of the holder to support it rotatably. Further, in the locking removing member there are disposed a pair of cam portions on the two sides of the engaging portion, respectively, and in the holder there is disposed an engaging protruding portion, which is brought into contact with the cam portion described above, and thus the device is so constructed that the engaging protruding portion is slid on the cam portion, accompanied by the inclination operation of the holder to incline the locking removing member.

By using the means described above, at the canceling operation, the locking removing member is rotated around either one of the fulcrum portions by the working member of the solenoid. Consequently the locking removing member can transmit the stroke of the working member without loss as a stroke for returning the holder by thrusting it.

Further, it is possible to set the point, at which the force of the working member of the solenoid is transmitted to the locking removing member, on the center line of the solenoid, so that it is possible to make this force act thereon without any deviation.

Still further, since a cam portion is disposed on the locking removing member, the force of the compression spring of the solenoid is added further to the locking removing member and therefore, even if it is subjected to vibrations, it is not shaken and thus it is possible to prevent generation of strange noise.

BRIEF DESCRIPTION OF THE DRAWINGS

FIG. 2 being a longitudinal cross sectional view of the automatic canceling device; FIG. 3 being a plan view, in which the upper plate of the case is removed; FIG. 4 being an exploded perspective view; FIGS. 5A and 5B being perspective views of the principal part indicating the locked state and the removed locking state, respectively, of the cam portion; FIGS. 6A and 6B being cross sectional views of the principal part in the neutral position and in the left or right, respectively.

DETAILED DESCRIPTION

Hereinbelow an embodiment of the present invention will be explained, referring to FIGS. 1A to 4.

Figure 2:
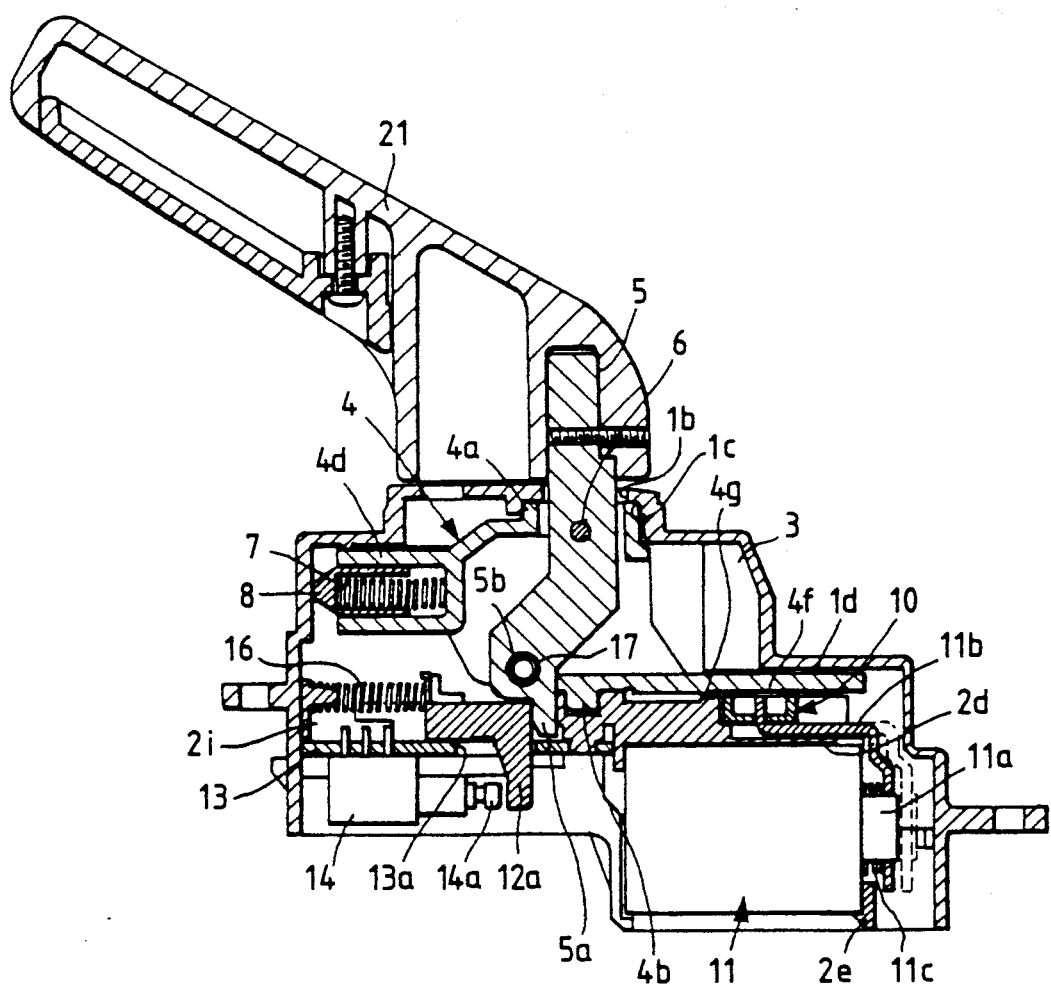
Figure 3:
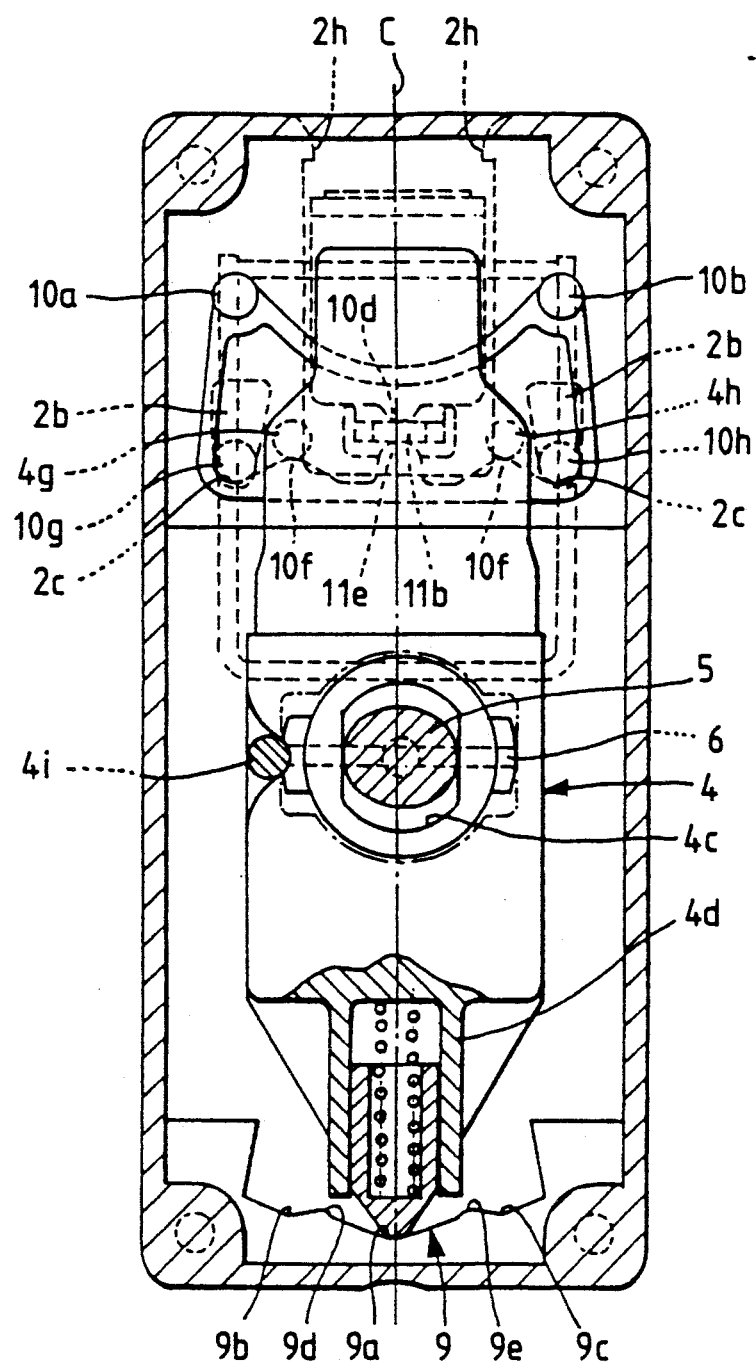
Figure 4:
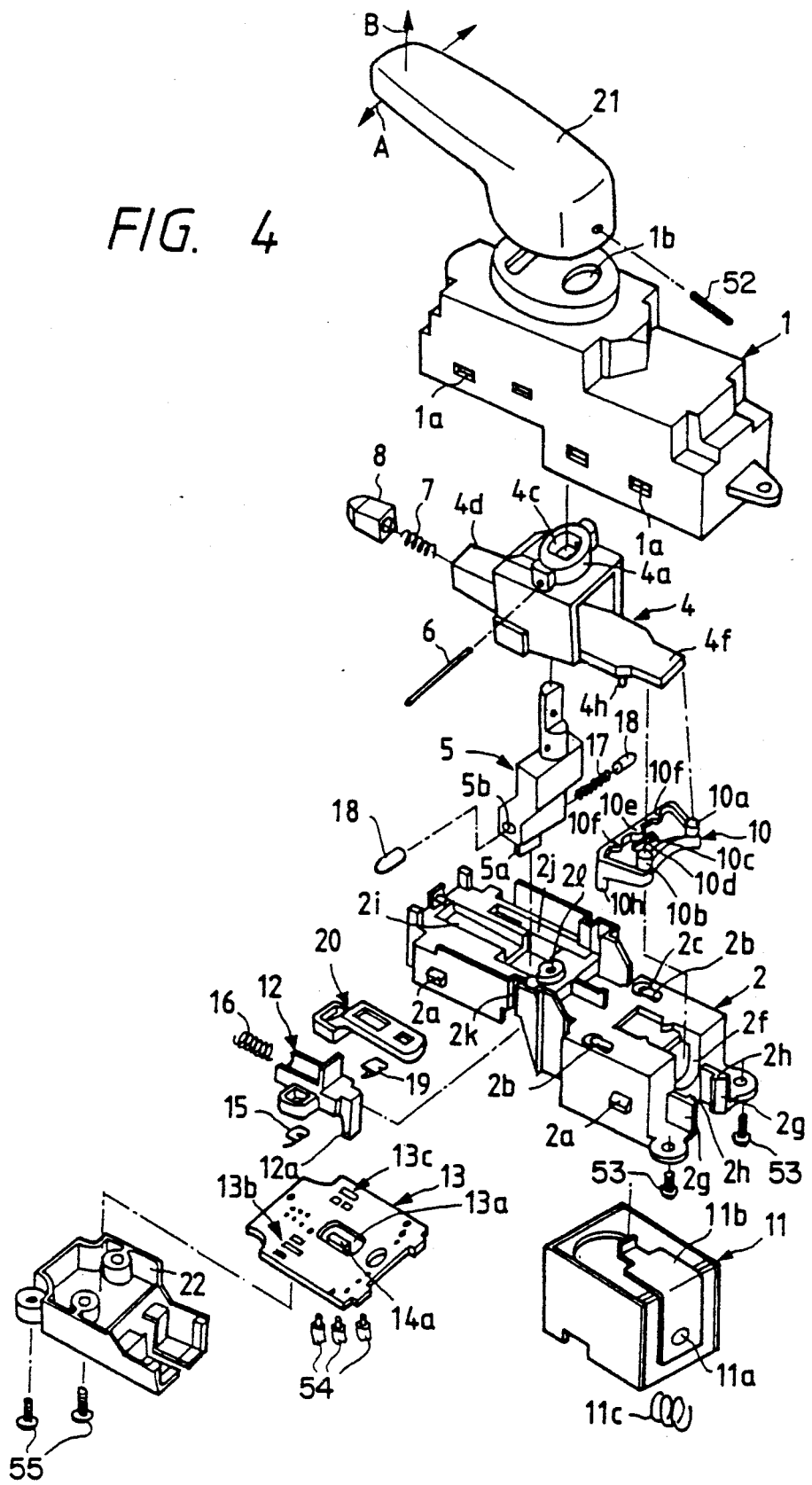
Figure 5A:
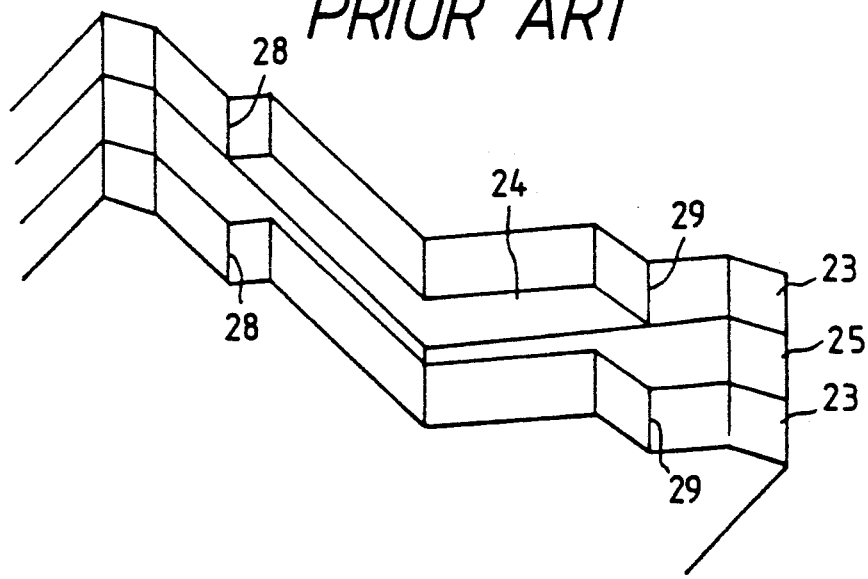
FIGS. 5A, 5B, 6A and 6B are schemes for explaining a prior art automatic canceling device for a winker.
Figure 5B:
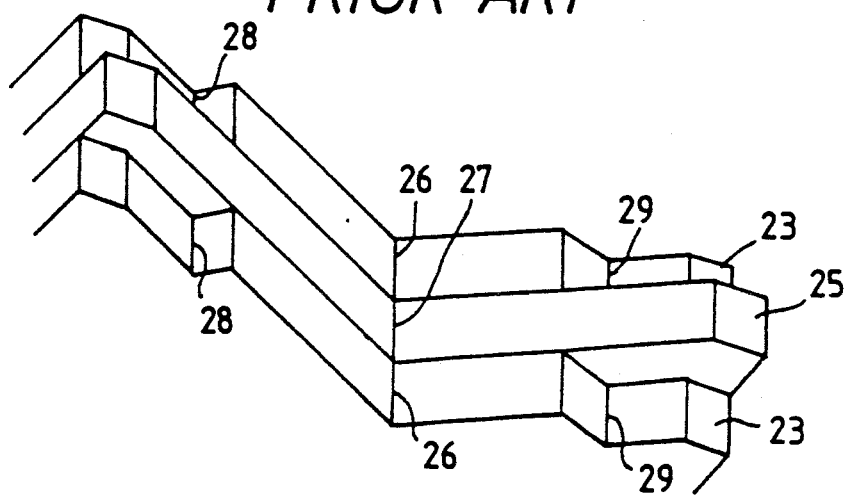
Figure 6A:
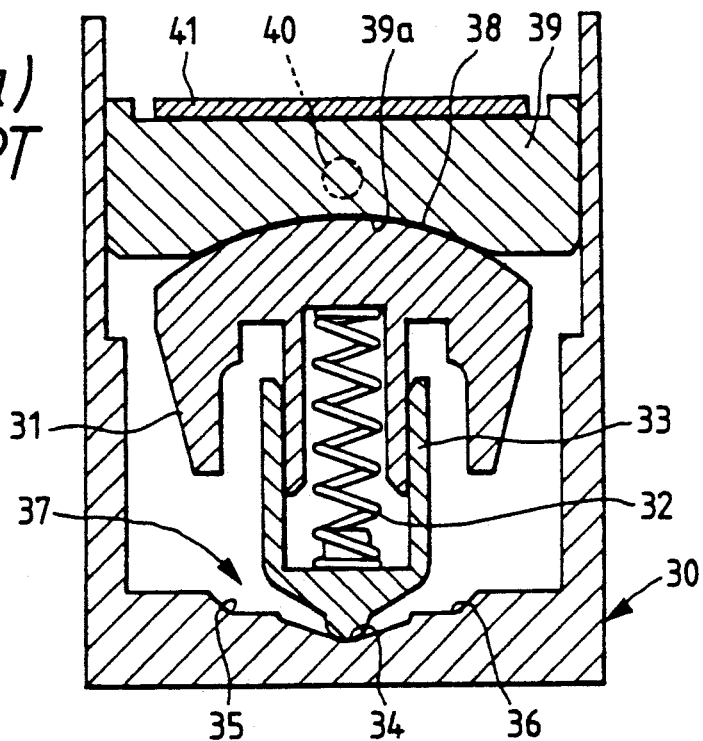
Figure 6B:
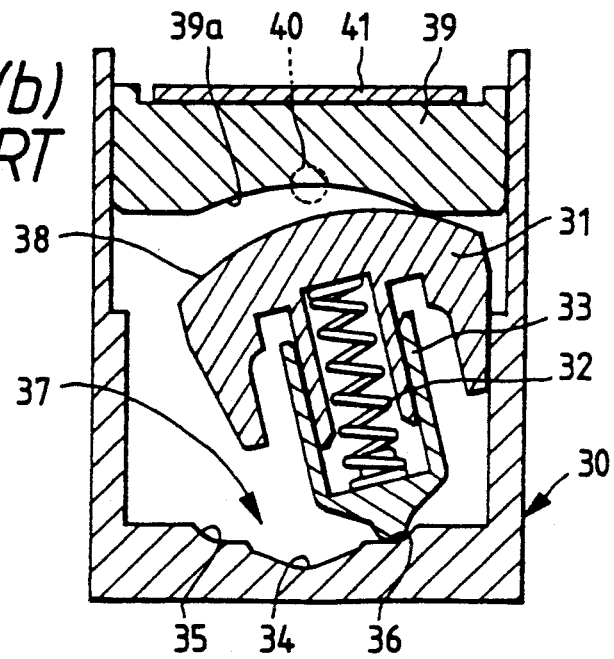

FIGS. 1A to 1D are cross sectional views of the principal part of the automatic canceling device for a winker indicating various states at the neutral position, in the course of the operation, at the lane change (in the course of the locking removing operation) and in the left or right position; FIG. 2 is a longitudinal cross sectional view of the automatic canceling device; FIG. 3 is a plan view, in which the upper plate of the case is removed; and FIG. 4 is an exploded perspective view.

In these figures, reference numeral 1 is an upper case, this upper case 1 being formed in a rectangular parallelepiped box, whose lower side is opened. At the lower end of this upper case 1 there is disposed a lower case 2 to form a receiving portion 3. These upper and lower cases 1 and 2 are combined so as to form one body by engaging an engaging protrusion 2a with an engaging hole 1a.

A through hole 1b is formed in the upper surface portion of the upper case 1 and further a ring-shaped concave step portion is formed at the periphery of the through hole 1b within the case 1 to constitute a bearing portion 1c. A round hole is formed in the upper surface portion of the lower case 2, which is opposite to this bearing portion 1c to constitute the other bearing portion 2l. Bearing portions 4a and 4b are inserted in these bearing portions 1c and 2l so that the holder 4 is supported rotatably. A passing lever 5 rotating in a direction perpendicular to the rotating direction of the holder 4 traverses this holder 4 and is supported rotatably. That is, a through hole 4c, through which the passing lever 5 passes, is formed at the center of the bearing portion 4a of the holder 4 and the lower opening of this through hole 4c is set, deviated from the bearing portion 4b. Consequently the passing lever 5 is formed, bent at the central portion thereof, the upper end thereof protruding from the through hole 4c of the holder 4 and further protruding from the through hole 1b of the case 1. The upper end portion of this passing lever 5 is supported rotatably by a fulcrum 6 inserted in the diametral direction of the bearing portion 4a of the holder 4. Finally the rotating direction of the passing lever 5 and the rotating direction of the holder 4 are perpendicular to each other.

A rectangular tube-shaped receiving portion 4d is disposed at the other free end portion of the holder 4 described above so as to protrude therefrom and a driving bar 8 is inserted in this receiving portion 4d through a compression spring 7. The end portion of this driving bar 8 is brought into contact with pressure with a cam 9 formed on the inner surface of the wall of the case 1 by the compression spring 7. This cam 9 consists of a groove 9a for holding the holder 4 at its central position, grooves 9b and 9c disposed on the two sides of this groove 9a for holding the holder 4 at the left and the right position, respectively, and step portions 9d and 9e, which are engaged therewith at the lane change as indicated in FIG. 3. On the other hand, a working plate portion 4f having a flat shape, whose end portion is narrowered, is disposed at the other free end portion of the holder 4 and a pair of engaging pins 4g and 4h are disposed on the lower surface (in FIG. 4) of this working plate portion 4f. These engaging pins 4g and 4h are engaged with a locking removing member 10 disposed on the lower surface of the working plate portion 4f.

This locking removing member 10 is formed approximately in a trapezoid plate shape, whose upper side is cut off in an arc shape. A pair of locking removing pins 10a and 10b are disposed at the two corners of the upper side so as to protrude therefrom. These locking removing pins 10a and 10b are extended so as to put the working plate portion 4f therebetween. Since the two locking removing pins 10a and 10b are disposed so that the distance therebetween is greater than the width of the working plate portion 4f, the locking removing pins 10a and 10b are not in contact with the working plate portion 4f at the neutral position. Further a rectangular hole 10c is formed at the central portion of the locking removing member 10 and supporting protrusions 10d and 10e are disposed so as to protrude from the centers of the upper and the lower side towards this hole 10c. The extremity of a working piece 11b secured to a working shaft 11a of a solenoid 11 is inserted between these two protrusions 10d and 10e so that the locking removing member 10 is driven, accompanied by the drive of the solenoid 11. The point p, at which the force of this working piece 11b is transmitted to the locking removing member 10, is set on the center line c of the working shaft 11a. Further cam bosses 10f and 10f are disposed on the two sides of the supporting protrusion 10e, respectively, on the lower side of the locking removing member 10 and each of the engaging pins 4g and 4h is engaged with each of these cam bosses 10f and 10f. Furthermore shaft portions 10g and 10h serving as pivot centers are disposed at the two corners of the lower side of the locking removing member 10, respectively, so as to protrude therefrom downward in FIG. 4. These shaft portions 10g and 10h are inserted in approximately elliptic guiding holes 2b and 2b formed in the lower case 2, respectively, as indicated in FIG. 3, so as to be guided thereby. When the locking removing member 10 is driven by the solenoid 11, one of the shaft portions 10g and 10 is brought into contact with one end 2c, 2c of one of the guiding holes 2b and 2b and supported thereby rotatably.

The solenoid 11 consists of a working shaft 11a affecting a pulling-in operation, when the solenoid is excited by the locking removing signal, as described previously; a working piece 11b secured to the extremity of this working shaft 11a, formed in a bent shape; and a compression spring 11c mounted on the working shaft 11a. It is prevented by the working piece 11b for the spring 11c to fall out. The solenoid 11 is inserted in the receiving portion 2d of the lower case 2, fastened by an engaging nail 2e so as not to fall out. The working shaft 11a of the solenoid 11 protrudes through an opening 2f formed in the lower case 2. Further the working piece 11b is disposed on the upper surface of the lower case 2 in a bent shape. The extremity of the working piece 11b is further formed so as to be bent upward and inserted between the supporting protrusions 10d and 10e in the hole 10c formed in the locking removing member 10 described previously. Furthermore protruding pieces 2g and 2g are disposed on the two edges of an opening 2f on the outer surface of the lower case 2 so as to protrude therefrom and engaging nails 2h and 2h for fastening the working piece 11b so as not to fall out are disposed on the surfaces of the upper portions of these protruding pieces 2g and 2g, which are opposite to each other, so as to protrude therefrom. In this way the working shaft 11a and the working piece 11b energized by the compression spring 11c in the falling out direction are fastened so as not to fall out by the fact that the two edges of the working piece 11b are engaged with the engaging nails 2h and 2h, respectively.

As described above, the passing lever 5 is supported rotatably by the holder 4 through the fulcrum 6. The lower end 5a of this passing lever 5 has an arc-shaped surface, whose center is the center of axis of the bearing portions 4a and 4b. This lower end 5a traverses the holder 4 and is engaged with a dimmer, slider 12 for a passing switch. This slider 12 is guided by an elongated hole 2; formed in the lower case 2. A thrusting piece 12a of this slider 12 traverses the lower case 2 and at the same time traverses a hole 13a formed in a printed board mounted on the lower surface of the lower case 2 so as to thrust to operate a stem 14a of a dimmer switch 14 mounted on the lower surface of the printed board 13. A sliding element 15 is held by this slider 12 and thus a passing operation is affected by the fact that the sliding element 15 is slid on a passing circuit pattern 13b on the printed board 13, accompanied by the sliding operation of the slider 12. Reference numeral 16 represents a compression spring energizing the slider 12 in the direction, which is opposite to the operation direction described above. A round hole 5b traversing the lower portion of the passing lever 5 from one side to the other, in which a compression spring 17 and driving bars 18 and 18 are located. The driving bars 18 and 18 thrusted by the compression spring 17 are slid on the cam bosses formed on the inner surface of the wall of the holder 4 so that node feeling is obtained at a predetermined angle of the passing lever 5.

A switching pattern 13c for switching the left and the right winker is formed on the printed board 13 and the slider 20, in which a sliding element 19 sliding on this switching pattern 13c is inserted, is guided by an elongated hole 2j formed in the lower case 2. A linking pin 4i disposed on the lower surface of the holder 4 so as to protrude therefrom is engaged with this slider 20 and the slider 20 is moved along the elongated hole 2j, accompanied by the rotational movement of the holder 4.

Reference numeral 21 is an operation lever engaged with the protruding end of the passing lever 5; 22 is a cover mounted on the lower surface of the lower case 2; 1d and 4g are arc-shaped protruding stripes disposed the 1 and the holder 4, respectively, so as to protrude therefrom. Operation lever 21 is secured to passing lever 5 by bolt-like element 52. Screws 55 secure cover 22 to lower case 2, and screws 53 secure lower case 2 to upper case 1. Conductors 54 connect printed board 13 with winking light control circuits (not shown).

The positioning of the case the lower case 2 is affected by the fact that recessed grooves 2k and 2k are disposed on both the side surfaces of the lower case 2, respectively, and that protruding stripes (not shown in the figure) formed on the inner surface of the wall of the case 1 are engaged with these recessed grooves 2k and 2k.

Now the operation of the embodiment thus constructed will be explained, referring to FIGS. 1A to 1D.

Figure 1A:
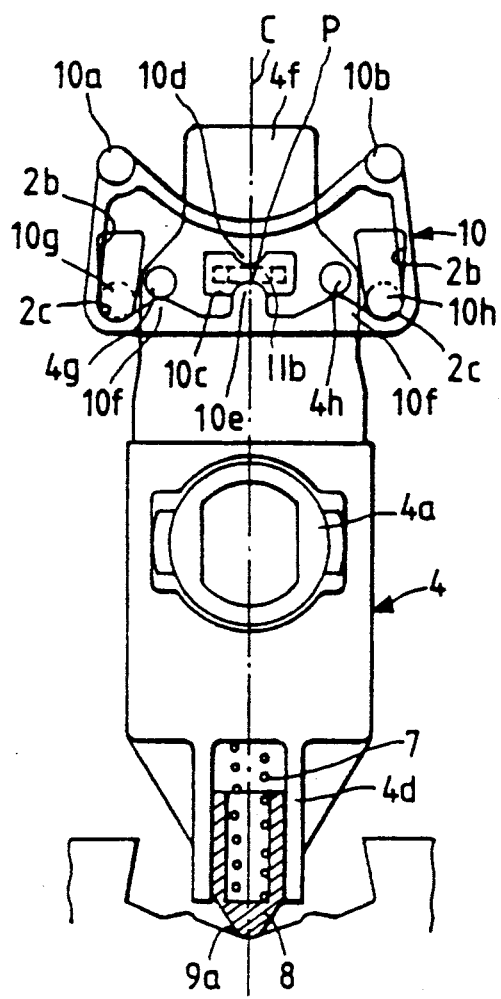
FIGS. 1A to 1D, 2, 3 and 4 are schemes for explaining an embodiment of the present invention, FIGS. 1A to 1D being schemes for explaining different operation states of the automatic canceling device for a winker according to the present invention.

In the state of the neutral position indicated in FIG. 1A, the holder 4 is held so that the driving bar 8 is thrusted to the groove 9a of the cam 9 by the compression spring 7. Further, in this state, a force is applied upward to the locking removing member 10 by the working piece 10b (resiliency of the compression spring 11c) engaged with the hole 10c formed therein and the summits of the two cam bosses 10f and 10f of the locking removing member 9 are brought into contact with pressure with the engaging pins 4g and 4h, respectively.

By setting appropriately the height of the cam bosses 10f and 10f, it is possible that the locking removing member 10 is not shaped by locating the shaft portions 10g or 10h of the locking removing member 10 at the end of one side of the guiding holes 2b or 2b and by increasing the spring force. In this state indicated in FIG. 1A the sliding element 19 of the slider 20 is at the center of the left and right winker switching pattern 13c of the printed board 13 and neither the left nor the right winker is lightened or winked.

Figure 1B:
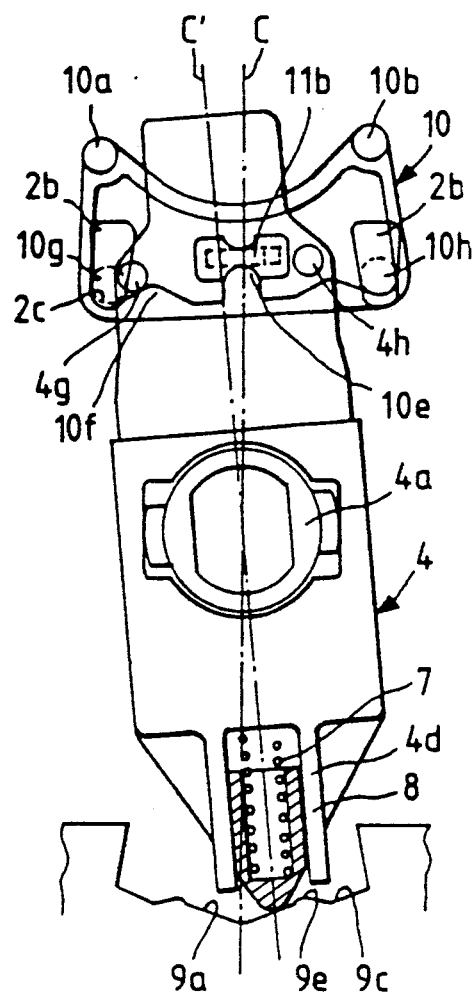
Figure 1C:
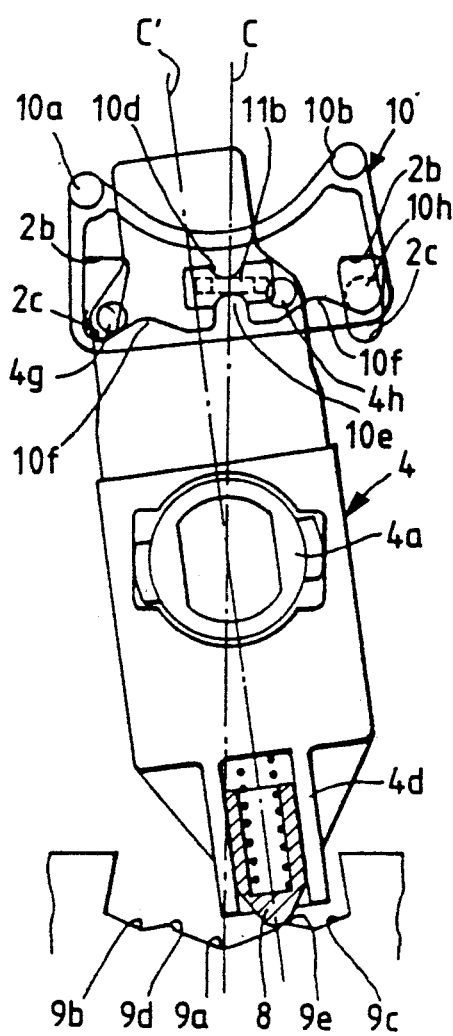
Figure 1D:
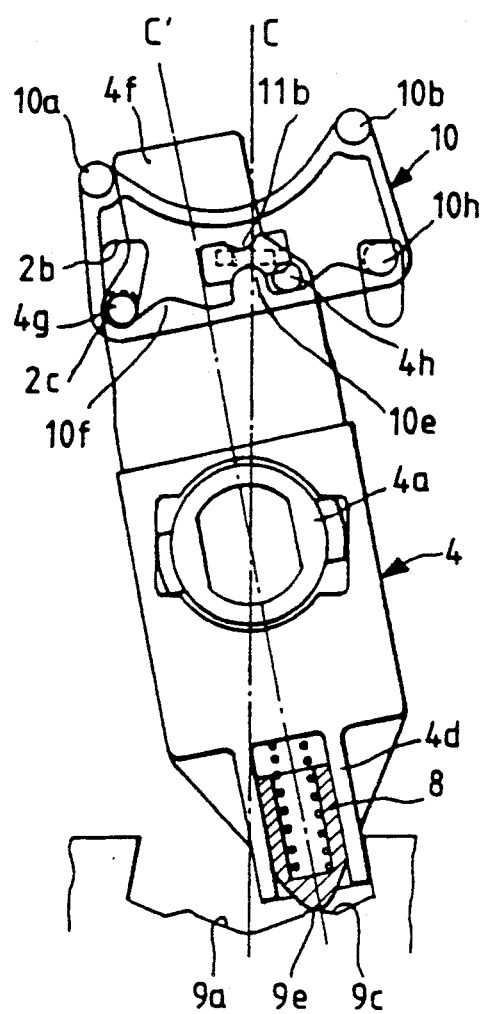

In the case where e.g. the left winker is lightened or winked, starting from the state indicated in FIG. 1A, when the operation lever 21 is moved in the direction indicated by an arrow A in FIG. 4, the passing lever 5 and the holder 4 are rotated in one body through the fulcrum 6. By this rotational operation, the line c is inclined up to the line c', as indicated in FIG. 1B, and the line connecting the two engaging pins 4g and 4h on the working plate portion 4f of the holder 4 is also inclined. That is, as indicated in FIG. 1B, the engaging pin 4g is moved downward and on the contrary the engaging pin 4h is moved upward so that only the engaging pin 4g, which is on the inclination side is slid on the cam boss 10f. In this way, the locking removing member 10 is inclined around the contact part between the working piece 11b and the supporting protrusion 10d or 10e so that the shaft portion 10g on the inclination side is brought into contact with one end 2c of the guiding hole 2b. Further, at the same time the driving bar 8 is also driven towards the right while compressing the compression spring 7. Furthermore, by manipulating the operation lever 21, the driving bar rides across the step portion 9e and is compressed towards the groove 9c by the compression spring 7 so that the holder 4 is held at the right winker working position, as indicated in FIG. 1D. In this state indicated in FIG. 1D, the side surface on the inclination side of the locking removing member 10 is in contact with the locking removing pin 10a of the locking removing member 10. Further, in this state indicated in FIG. 1D, the sliding element 19 of the slider 20 is slid to the position, where the right winker contact in the left and right winker switching pattern 13c on the printed board 13 is conductive, so that the right winker is lightened or winked.

Next the locking removing operation of the winker will be explained.

When a locking removing signal is generated by the returning rotation of the steering wheel, etc. to excite the solenoid 11, the working shaft 11a is pulled-in to the left in FIG. 2 and at the same time the working piece 11b is moved to the left (downward in FIG. 1D) against the compression spring 11c. In this way, the supporting protrusions 10d and 10e of the locking removing member 10, with which the extremity of the working piece 11b is engaged, are moved downward in FIG. 1D. Then the locking removing member 10 is moved as described above, the supporting protrusion 10e acting as the point of force, the shaft portion 10g brought into contact with the one end 2c of the guiding hole 2b as the fulcrum, the locking removing pin 10a as the point of action. That is, the locking removing member 10 is rotated clockwise around one of the shaft portions 10g and a rotating force towards the right is applied to the left end of the working plate portion 4f of the holder 4 by the locking removing pin 10a. Consequently, the holder 4 is rotated clockwise and the driving bar 8 at the lower end of the holder 4 rides across the step portion 9e from the groove 9c to arrive at the groove 9a. When the driving bar 8 arrives at the groove 9a, the holder 4 is rotated to be returned to the neutral position indicated in FIG. 1A by a partial force of the driving bar 8, to which the spring force of the compression spring 7 is applied, and held there. In this way, lightening or wink of the right winker is stopped.

Next the lane change operation will be explained. In this case, the operation lever 21 is rotated to rotate the holder 4 through the passing lever 5 and the fulcrum 6. However, as indicated in FIG. 1C, the driving bar 8 is moved from the state indicated in FIG. 1A up to the position where it is engaged with the step portion 9d or 9e so that the node feeling is obtained, and it does not arrive at the groove 9b or 9c, which is formed at the extremity of either one of the sides. Consequently, when the state indicated in FIG. 1C is held, the sliding element 19 of the slider 20 is connected with either one of the contacts of the left and right winker switch so that the left or the right winker is lightened or winked. However, as soon as the operation force applied to the operation lever 21 is stopped, the holder 4 is rotated from the state indicated in FIG. 1C towards the neutral position by the partial force of the driving bar described previously to be returned to the state indicated in FIG. 1A. In this way, the lightening or wink of the left or right winker is stopped.

In the embodiment described above thus constructed, since the automatic canceling device for a winker comprises the upper and lower cases 1 and 2; the holder 4 supported pivotably by these upper and lower cases 1 and 2; the locking mechanism holding the holder 4 at the neutral position or one of the inclined positions, which mechanism consists of the compression spring 7, the driving bar 8, the cam 9, etc.; the solenoid 11 having the working piece 11b moving linearly in the direction perpendicular to the pivot direction of the holder 4; and the locking removing member 10 interposed between the working piece 11b of the solenoid 11 and holder 4 and acting so as to return the holder 4 towards the neutral position by the driving action of the working piece 11b; wherein the locking removing member 10 consists of the supporting protrusions 10d and 10e engaged with the working piece 11b; the shaft portions 10g and 10h; and the locking removing pins 10a and 10b brought into contact with the holder 4 and there is disposed the one end 2c of the guiding hole 2b, which is brought into contact with the shaft portion 10g or 10h and supports it rotatably at the returning operation of the holder 4; it is possible to set the point, where the force of the working piece 11b of the solenoid 11 is transmitted to the locking removing member 10, on the center line of the working shaft 11a and therefore the non-uniform force applied to the working shaft in a prior art device disappears. Therefore it can be intended to increase the durability of the solenoid 11 and to prevent the decrease in the attractive force.

Further, since receiving the force of the solenoid, the locking removing member 10 is rotated around one of the shaft portions 10g or 10h to push to return the holder towards the neutral position, it is not necessary to increase the guiding length of the sliding in order to stabilize the linear movement, as required heretofore, and the stroke of the working piece 11b is transmitted surely as the state (force) for returning the holder 4 through the rotating movement of the locking removing member 10. In this way, not only no loss in the stroke is produced, but also it is possible to set various sorts of returning forces and strokes of the holder 4 for the working force and the stroke of the working piece 11b e.g. by setting appropriately the distance between the shaft portion 10g and 10h and the supporting protrusions 10d and 10e or the locking removing pins 10a and 10b.

Still further, since there are disposed a pair of cam bosses 10f on both the sides of the supporting pins 4g and 4h brought into contact with the cam bosses 10f in the holder 4 so that the engaging pins 4g and 4h are slid on the cam bosses 10f, accompanied by the inclining movement of the holder 4 to incline the locking removing member 10, the locking removing member 10 is inclined without shaking and the engaging pins 4g and 4h are never brought into contact with the side end surfaces of the holder 4 to generate strange noise. Furthermore, by disposing the cam bosses 10f it is possible to regulate the quantity of protrusion of the working piece 11b and the working shaft 11a and to obtain a sure attractive force. Further, since the shaft portions 10g and 10h are set closer to the one end 2c at the neutral position by the cam bosses 10f, the locking removing member 10 effects a rotating movement around the shaft portion 10g or 10h and therefore the movement thereof is simplified. Still further, contrarily to the fact that in the prior art example the movement of the working shaft of the solenoid accompanies also a reverse movement, in the embodiment described above one operation is affected by a one-directional displacement.

In this way, the reliability of the product is improved and it is possible to intend to reduce the size thereof.

As explained above, according to the present invention, it is possible to increase the durability of the solenoid, to prevent the decrease in the attractive force, to effect a sure transmission of the quantity of displacement, to improve the reliability of the product and to intend to reduce the size.

What is claimed is:

1. An automatic canceling device for a winker comprising:
   a case;
   a holder mounted pivotably on said case;
   a locking mechanism engaged with said holder for holding said holder at neutral, right, or left positions;
   a solenoid disposed in said case and energized by an unlock signal, said solenoid having a working member;
   a locking removing member disposed between said working member of said solenoid and said holder, and acting to return said holder towards said neutral position;
   wherein said locking removing member includes an aperture having an engaging portion coupled to said working member, a first fulcrum portion disposed on one surface of said locking removing member and positioned for contacting said holder, and a second fulcrum portion disposed on another surface of said locking removing member;
   said device comprising further a supporting portion which rotatably supports said second fulcrum portion, and positioned for contacting said second fulcrum portion.

* * * * *